United States Patent [19]

Wax et al.

[11] Patent Number: 5,054,434

[45] Date of Patent: Oct. 8, 1991

[54] SUPPRESSION OF AMMONIA ODORS FROM ANIMAL WASTES

[75] Inventors: Michael J. Wax, Columbia; Timothy A. Boyer, Baltimore, both of Md.

[73] Assignee: W. R. Grace & Co.-Conn., New York, N.Y.

[21] Appl. No.: 413,135

[22] Filed: Sep. 27, 1989

[51] Int. Cl.$^5$ ............................................. A01K 1/015
[52] U.S. Cl. .................................................... 119/171
[58] Field of Search ............................................. 119/1

[56] References Cited

U.S. PATENT DOCUMENTS

| | | | |
|---|---|---|---|
| 3,059,615 | 10/1962 | Kuceski et al. | 119/1 |
| 3,892,846 | 7/1975 | Wortham | 119/1 X |
| 4,263,873 | 4/1981 | Christianson | 119/1 |
| 4,306,516 | 12/1981 | Currey | 119/1 |
| 4,405,354 | 9/1983 | Thomas, II et al. | 119/1 X |
| 4,424,763 | 1/1984 | Johnson | 119/1 |
| 4,509,457 | 4/1985 | Durbye | 119/1 |
| 4,517,919 | 5/1985 | Benjamin et al. | 119/1 |
| 4,638,763 | 1/1987 | Greenberg | 119/1 |

FOREIGN PATENT DOCUMENTS

| | | | |
|---|---|---|---|
| 1191674 | 8/1985 | Canada | 119/1 |
| 3044822 | 2/1988 | Japan | 119/1 |
| 3044823 | 2/1988 | Japan | 119/1 |
| 3315200 | 12/1988 | Japan | 119/1 |

OTHER PUBLICATIONS

H. L. T. Mobley and B. P. Hausinger, "Microbial Ureases: Significance, Regulation, and Molecular Characterization", Microbiological Reviews, vol. 53, pp. 85-108, 1989.

*Primary Examiner*—Robert P. Swiatek
*Assistant Examiner*—Todd E. Manahan
*Attorney, Agent, or Firm*—Edward J. Cabic

[57] ABSTRACT

The accumulation of gaseous ammonia in areas wherein animals are housed or maintained is controlled by providing to the areas animal litter, bedding, or other absorbent material which contain a low molecular weight, non-volatile organic acid. Acids such as citric, malic, fumaric, phosphoric, tartaric, maleic, malonic, succinic, sorbic and mixtures of these acids are used and especially phosphoric and fumaric. These acids can be used in concentrations of about 0.0001 to 2 wt % of the dry bedding.

29 Claims, No Drawings

SUPPRESSION OF AMMONIA ODORS FROM ANIMAL WASTES

BACKGROUND OF THE INVENTION

1. Field of the Invention

This invention is concerned with a method for the control of ammonia which is being generated by animals.

2. Description of the Previously Published Art

Ammonia is generated quickly in any area in which urine is allowed to collect. This is the result of enzyme-catalyzed hydrolysis of urea, which is a key component of urine. Each molecule of urea may react with water to produce two molecules of ammonia. Ammonia has a disagreeable odor, and may be toxic at high concentrations.

In areas in which animals such as horses, cows, sheep, and pigs are kept, such as stalls, barns, cattle cars, or other enclosures, or in outdoor areas such as feed lots where many animals are maintained in close proximity, considerable amounts of ammonia may accumulate. This is a result of the enzyme-catalyzed hydrolysis of urea in the animal urine, which may collect in significant quantities. As mentioned above, the ammonia possesses an unpleasant smell. Further, ammonia is known to be harmful to animals.

The family of enzymes which catalyze the hydrolysis of urea are known as ureases, here collectively referred to as "urease". In the setting of animal areas, the sources of urease are various bacteria. For example, Proteus mirabilis, found in animal digestive tracts, and Bacillus pasteurii, found in soil, both produce urease. Many types of bacteria may in fact be present. These bacteria need nitrogen for growth and sustenance. As they cannot utilize urea directly to satisfy this need, they produce urease to convert the urea into the usable form of ammonia.

Several methods of lowering the level of ammonia in animal areas are known. The first of these is increased ventilation: by increasing the flow of air into a given space, the average ammonia concentration will be lessened. However, this method may be quite expensive, as it requires power for fans or blowers, as well as entailing increased heating or cooling costs when external air is brought into an enclosed space. Further, in feed lots and similar areas ventilation is impractical.

A second method of controlling the level of ammonia in a given area is through the use of absorbents which are specific for ammonia. However, specific absorbents may be quite expensive. A further concern is that large quantities of absorbents may be required to cope with the ammonia generated in animal areas.

A third method of controlling ammonia accumulation is to prevent its formation. This may be done through the use of biocides to kill the bacteria which produce urease. Biocides which do not harm animals or humans, however, typically will not be effective against all the possible strains of bacteria which may be present. Bacteria also may develop resistance to biocides.

Desiccation also may be used to prevent ammonia formation. When no free liquid is available, little bacterial growth will occur, and hence little urease will be present. In view of the large amounts of urine formed by animals, effective desiccation is very difficult, and will require large quantities of desiccant. Further, these desiccants may be irritating or toxic to animals.

Alternatively, chemicals which prevent catalysis of the hydrolysis of urea by urease may be used. These are known as urease inhibitors. Because each molecule of urease may catalyze the formation of many molecules of ammonia, very small amounts of inhibitor should be needed to prevent the production of noticeable or toxic amounts of ammonia. Thus, it is to be expected that low part-per-million (ppm) levels of inhibitors will be needed.

Finally, chemicals which operate according to more than one of the above mechanisms may be particularly effective. Acids are known to inhibit the growth of urease-producing bacteria. Further, the rate of urease-catalyzed hydrolysis is slowed by a drop in pH. Some acids also may act as inhibitors of urease. For example, it is known that phosphoric acid is an inhibitor of urease; see H. L. T. Mobley and B. P. Hausinger, "Microbial Ureases: Significance, Regulation, and Molecular Characterization", *Microbiological Reviews*, volume 53, pages 85–108, 1989. Further, any ammonia which is formed may react with acid to form non-volatile ammonium salts.

U.S. Pat. No. 4,306,516 teaches the use of sulfuric acid in a poultry litter. However, the sulfuric acid is present only as an additive to an iron oxide-iron sulfate litter. No use of acid on more common litters as the active ammonia control agent is mentioned.

Canadian Patent 1,191,674 claims the use of a two component additive for litter. The first component is urea phosphate, phosphoric acid, sulfuric acid or an alkali metal bisulfate, and with the second component which is a so-called preservative organic acid or its salts or propane-1,2-diol esters. Relatively large amounts of this mixture can be used, up to 20% of the litter. These amounts will be economical in poultry houses, where litter may be changed annually or less often, but not in, for example, equine operations, where the time between changes of litter is days or weeks. Further, the use of volatile (e.g., acetic), foul-smelling (e.g., isobutyric), and toxic (e.g., acrylic) acids is taught, making the invention less useful in most applications.

OBJECTS OF THE INVENTION

It is an object of the current invention to provide a method for the prevention of the accumulation of gaseous ammonia in animal areas.

It is a further object of this invention to provide a method for the prevention of the accumulation of gaseous ammonia from urine collected in animal areas.

It is a further object of this invention to provide a method for the application of compounds which prevent the accumulation of gaseous ammonia from urine to animal litter or bedding, or to other absorbent materials present in animal areas.

It is a further object of this invention to provide an animal litter, bedding or other adsorbent material with a substance which will control the accumulation of gaseous ammonia in animal areas.

These and further objects of the current invention will become apparent as the description below proceeds.

SUMMARY OF THE INVENTION

A method has been developed to temporarily prevent ammonia release upon the breakdown of urea excreted by animals. The method involves adding low molecular weight, non-volatile acids to the animal litter or bedding. Acids which are substantially non-toxic are preferred; several acids isolated from natural sources are suitable in this regard. Citric, fumaric, malic, phosphoric, tartaric, maleic, malonic, succinic, and sorbic are particularly suitable acids, being relatively innocuous, as well as low cost.

The acid may be added to the animal bedding in pure form, on a solid carrier, in a solution, or through other suitable dispensing methods. The amount needed will vary with the acid used, and typically will be low.

Acids may function to prevent the accumulation of gaseous ammonia formed from urine in animal areas by one or more means. First, the urease enzyme is a less effective catalyst outside of some optimum pH range. Adding acid to a medium lowers the pH outside of this optimum, and thus retards urea hydrolysis and consequently ammonia formation. Second, some acids are inhibitors of the enzyme, and therefore impede its catalytic performance. Third, urease-producing bateria grow more slowly in acid media. When fewer bacteria are present, less urease is present, and so less ammonia will be formed. Fourth, if ammonia is formed, it will react with acid to form a non-volatile ammonium salt. For example, citric acid will react with ammonia to form ammonium citrate. By trapping ammonia, less will be free to diffuse to the gas phase. While not wishing to be bound to any particular theory, we believe that one or more of the above mechanisms is responsible for the action of the acids.

The acid will be particularly effective when applied to litter or bedding with water absorbent properties. Water-absorbent materials such as wood shavings will reduce the amount of free liquid in which the urease-catalyzed hydrolysis of urea may occur. Thus, the acid will act in combination with an absorbent litter or bedding to result in greatly reduced levels of ammonia.

In one preferred embodiment the acid is applied to animal litter, bedding, or other absorbent material which is present in such areas. The acid will be applied in any effective amount. An effective amount may be defined as the amount necessary to maintain the ambient ammonia level below some desired value. This value may be the threshold for olfactory detection, the threshold limit value, TLV, set for worker exposure, i.e., 50 ppm, or any other chosen value. A convenient value is 10 ppm. The amount of the compound needed obviously will depend upon the targeted maximum ammonia level, and also will depend upon the litter, bedding, or other absorbent material used, as well as on such factors as the nature and number of animals, temperature, cleanliness, etc. In general acid concentrations of about 0.0001 to 2 wt %, expressed as the ratio of the weight of compound per weight of dry bedding, will be used. Preferably, about 0.001 to 1 wt %, and most preferably, about 0.005 to 0.5 wt %, of acid will be used.

DESCRIPTION OF THE PREFERRED EMBODIMENTS

Acids which are useful in preventing the accumulation of gaseous ammonia are defined by four criteria:
(1) Low molecular weight per acid functionality;
(2) High acidity;
(3) Lack of volatility; and,
(4) Lack of toxicity.
These criteria may be evaluated as follows.

The molecular weight per acid functionality should be low so that only a small amount of acid will be needed to function effectively. Preferably, the acid should have a molecular weight of less than 250 per available proton. More preferably, this value will be less than 150, and most preferably less than 75. An available proton is defined as a hydrogen ion in the molecule which may be donated to free ammonia, so that an acid ammonium salt is formed.

The acidity should be high also to limit the amount of acid which must be used for control. One measure of acidity is the $pK_a$, which is the negative of the common logarithm of the acid dissociation constant. A molecule which contains several acidic groups will have several $pK_a$ values, one for each of these groups. Preferably, the first $pK_a$ of the acid should be less than 5. More preferably, this will be less than 4, and most preferably less than 3.

The lack of volatility is defined in terms of smell. An acid should be selected which will not annoy or irritate the occupants of these animal areas. Any acid which has a noticeable smell should not be used.

Finally, the lack of toxicity is essential to avoid endangering animal or human health. Preferably, the acute oral $LD_{50}$ value for the acid should be greater than 500 mg/kg. More preferably, this value will be greater than 1000 mg/kg, most preferably, greater than 2000 mg/kg.

Many acids will meet the criteria of the instant invention. These include certain naturally occurring and artificial carboxylic and substituted carboxylic acids, as well as phosphoric acid. Some particularly useful acids are indicated in Table 1. These all have low volatilities and hence no odors, low toxicities, good acidities, and low molecular weights per available proton. Other acids meet some but not all of the criteria, and therefore are not suitable. For example, acetic acid has reasonable acidity, low molecular weight, and low toxicity, but is volatile and thus has a strong and unpleasant smell. Boric acid is low in molecular weight, toxicity, and volatility, but is not very acidic.

It should be noted that having acidic protons is a crucial point of this invention. Thus, salts of acids meeting the above criteria are not generally effective. The sodium salt of citric acid is not a useful ammonia control agent.

TABLE 1

Some acids processing desirable attributes for use in preventing the accumulation of ammonia.

| Acid | First $pK_a$ | Molecular Weight/ Available Proton | Oral $LD_{50}$ (mg/kg) | Smell |
|---|---|---|---|---|
| Citric | 3.1 | 64 | 11,700 (rat) | None |
| Fumaric | 3.0 | 58 | — | None |
| Maleic | 1.8 | 58 | 700 (rat) | Faint |
| Malic | 3.4 | 67 | 5,000 (rabbit) | None |
| Malonic | 2.8 | 52 | 1,300 (rat) | None |
| Phosphoric | 2.1 | 33 | 1,500 (rat) | None |
| Sorbic | 4.8 | 112 | 7,400 (rat) | None |
| Succinic | 4.2 | 59 | — | None |
| Tartaric | 3.0 | 75 | — | None |

The conventional animal litter, bedding and absorbent materials used in animal areas includes straw, wood shavings, wood chips, saw dust, clay, rice hulls, corn cobs, sand, vermiculite, etc. Mixtures of these materials can also be used.

Methods of application must ensure a uniform and continuous distribution of the acid. If patches of bedding, litter, or absorbent material exist which are not treated with acid, substantial amounts of ammonia may be formed. One suitable application method is merely to sprinkle or dust compound over the bedding, litter, or absorbent material as a pure solid. Compounding with one or more additional solids prior to sprinkling or dusting would be acceptable. These solids might absorb moisture from animal wastes, prevent the formation of some gaseous toxicant other than ammonia from said wastes, be colored to indicate the presence of the compound, or have some other purpose. Examples of such solids include zeolites, iron oxide, vermiculite, and other inorganic oxides and similar materials.

In addition to being sprinkled or dusted onto bedding, litter, or other absorbent material as a pure solid or in admixture with other solids, the acid may be impregnated onto a solid carrier prior to application. Such a carrier may serve merely as a vehicle for the dispersal of the enzyme inhibitor, or it may have some additional function. Suitable carriers include natural and synthetic zeolites and clays, as well as other materials.

As an alternative to dispersal as a solid, the acid may be dissolved in water or other solvent, and the resulting solution sprayed or poured onto the bedding, litter, or other absorbent material. Spraying of a solution is a preferred method of application, as it may yield a very uniform distribution of the compound. A hand-pumped sprayer or other device may be used for this purpose. Slurries may be used in place of solutions for solvents in which the compound is sparingly soluble.

The acid may be applied to bedding, litter, or other absorbent materials before they are placed in animal areas. This application may take the form of simple physical mixing. Alternatively, the acid may be impregnated onto the bedding or other material. This impregnation may be done using a spray, immersion into a bath, or other suitable method, with an optional drying step. If the bedding or other material is artificial, the compound may be added to the raw materials during production.

The treated bedding, litter or other absorbent material can be used for larger farm animals such as horses, cows, sheep and pigs; for domestic animals such as cats and dogs; and for smaller animals such as mice, rats, guinea pigs, hamsters, gerbils and other small mammals.

It is recognized that for birds the primary form of nitrogen waste is uric acid and not urea. However, as the uric acid decomposes, it forms urea which can be hydrolyzed enzymatically to form ammonia. Control of the levels of this ammonia can be achieved using the present treated bedding, litter or other absorbent material. Accordingly, the bedding, litter or other absorbent material can also be used for fowl and poultry such as chickens, turkeys, ducks, etc.

To test the effectiveness of the acid the following procedure has been used. A synthetic urine is made by combining 2.3 wt % urea and 1.1 wt % sodium chloride. To mimic the presence of bacteria, 200 units of jack bean urease is added to the synthetic urine. Jack bean urease is a readily available form of urease which is suitable for use in this context because ureases from most natural sources appear to act similarly. See "Jack Bean Urease (EC 3.5.1.5).8. On the Inhibition of Urease by Amides and Esters of Phosphoric Acid" by R. K. Andrews et al, J. Am. Chem. Soc. 1986, 108, 7124–7125.

This urine is then poured over a sample of bedding or other absorbent material to which the acid has been applied. The treated sample is covered so that any gases produced may accumulate. The presence of ammonia is tested for by using Draeger tubes.

Having described the basic aspect of the invention, the following examples are given to illustrate the specific embodiments thereof.

EXAMPLE 1

This example illustrates the use of citric acid in the presence of two different types of bedding material.

Two 8 oz. polyethylene bottles were charged with 15 g of rice hulls and 15 g of sawdust, respectively. Into each was added 15 g of the synthetic urine described above, which is a 2.3 wt % urea/1.1 wt % NaCl solution with 200 units of the enzyme urease. Also present in this mixture was 12 mg of citric acid. The bottles were capped, and incubated in a shaker bath at 37.5° C. After 4 hr, no ammonia smell could be detected in either bottle. By contrast, identical bottles not containing citric acid smelled strongly of ammonia.

EXAMPLE 2

This example illustrates the use of other acids to control the accumulation of ammonia.

Following the procedure of Example 1, 12 mg of malic acid, 6 mg of fumaric acid, and 6 mg of phosphoric acid were found to be sufficient to prevent the accumulation of noticeable amounts of ammonia.

COMPARISON EXAMPLE 1

This example illustrates that acids which do not meet the stated criteria may not be effective.

Following the procedure of Example 1, boric acid (36 mg) was tested and found to not control the accumulation of ammonia. Boric acid has a first $pK_a$ of 9.1, and this does not have a first $pK_a$ which is within the stated preferred range.

COMPARISON EXAMPLE 2

This example illustrates that the salts of acids, which lack acidic protons, may not be effective.

Following the procedure of Example 1, sodium citrate (24 mg) was found not to control the accumulation of ammonia.

EXAMPLE 3

This example illustrates the effectiveness of citric acid when live urease-producing bacteria were substituted for urease.

An 8 oz. polyethylene bottle was charged with 6 g of rice hulls and 24 g of synthetic urine, which is a 2.3 wt % urea/1.1 wt % NaCl solution to which 24 mg of citric acid had been added. Bacillus pasteurii then was added to this mixture, which subsequently was incubated in a shaker bath at 37.5° C. After one day, no ammonia was evident in this bottle (less than 5 ppm as measured using a Draeger tube). By contrast, the dead space in an identical bottle not containing citric acid contained more than 700 ppm of ammonia.

It is understood that the foregoing detailed description is given merely by way of illustration and that many variations may be made therein without departing from the spirit of this invention.

What is claimed is:

1. Animal litter, bedding or other absorbent material containing as the sole additive, which affects pH, 0.0001 to 2 wt % of a low molecular weight per acid functionality, nontoxic, non-volatile acid selected from the group consisting of malic, fumaric, tartaric, succinic, sorbic, an acid having an acidity such that the first $pK_a$ of the acid is less than 3, and mixtures thereof to prevent the accumulation of gaseous ammonia formed from free liquid urine in animal areas where the animal litter, bedding or other absorbent material is applied, said animal litter, bedding or other absorbent material being selected from the group consisting of straw, wood shavings, wood chips, saw dust, rice hulls, vermiculite and mixtures thereof.

2. Animal litter, bedding or other absorbent material according to claim 1, wherein the acid is fumaric acid.

3. Animal litter, bedding or other absorbent material according to claim 1, wherein the acid is phosphoric acid.

4. Animal litter, bedding or other absorbent material according to claim 1, wherein the acid is applied in an effective amount to produce a concentration of about 0.001 to 1.0 wt %.

5. Animal litter, bedding or other absorbent material according to claim 4, wherein the acid is applied in an effective amount to produce a concentration of about 0.005 to 0.5 wt %.

6. Animal litter, bedding or other absorbent material according to claim 1, wherein the acid is selected from the group consisting of phosphoric, maleic and malonic.

7. A method for the prevention of the accumulation of ammonia in areas wherein animals are housed or maintained comprising providing in said areas animal litter, bedding or other absorbent material containing as the sole additive, which affects pH, a low molecular weight per acid functionality, nontoxic, non-volatile acid selected from the group consisting of malic, fumaric, tartaric, succinic, sorbic, an acid having an acidity such that the first $pK_a$ of the acid is less than 3, and mixtures thereof, said animal litter, bedding or other absorbent material being selected from the group consisting of straw, wood shavings, wood chips, saw dust, rice hulls, vermiculite and mixtures thereof and said acid being present from 0.0001 to 2 wt % of said animal litter, bedding or other absorbent material.

8. A method according to claim 7, wherein the animals are horses, cows, sheep, or pigs.

9. A method according to claim 7, wherein the animals are cats, dogs, mice, rats, guinea pigs, hamsters, or gerbils.

10. A method according to claim 7, wherein the acid is selected from the group consisting of phosphoric, maleic and malonic.

11. A method according to claim 7, comprising applying said acid to animal litter, bedding, or other absorbent material present in said areas.

12. A method according to claim 11, wherein the acid is applied by sprinkling or dusting of the acid in substantially pure form.

13. A method according to claim 11, wherein the acid is applied by sprinkling or dusting over the bedding, litter, or other absorbent material solid particles containing the acid.

14. A method according to claim 13, wherein the particles are acid mixed with one or more solids.

15. A method according to claim 14, wherein the solid is selected from the group consisting of natural zeolites, synthetic zeolites, clays and inorganic oxides.

16. A method according to claim 11, wherein the acid is applied by sprinkling or dusting over the bedding, litter, or other absorbent material an acid impregnated solid carrier.

17. A method according to claim 11, wherein the acid is applied by spraying or pouring over the litter, bedding, or other absorbent material a solution of the acid dissolved in a solvent.

18. A method according to claim 17, wherein the solvent is water.

19. A method according to claim 11, wherein the acid is applied by spraying or pouring over the litter, bedding, or other absorbent material a slurry of a mixture of the acid and a solvent in which the acid is sparingly soluble.

20. A method according to claim 11, wherein the acid is applied to the litter, bedding, or other absorbent material prior to its placement in animal areas.

21. A method according to claim 20, wherein the acid is applied by simple physical mixing with the litter, bedding, or other absorbent material.

22. A method according to claim 20, wherein the acid is impregnated onto the litter, bedding, or other absorbent material.

23. A method according to claim 22, wherein the litter, bedding, or other absorbent material is dried after the impregnation.

24. A method according to claim 11, wherein the acid is impregnated by spraying a solution of the acid.

25. A method according to claim 24, wherein the litter, bedding, or other absorbent material is dried after the impregnation.

26. A method according to claim 11, wherein the acid is impregnated by immersing the litter, bedding, or other absorbent material into a solution of the acid.

27. A method according to claim 26, wherein the litter, bedding, or other absorbent material is dried after the impregnation.

28. A method according to claim 11, wherein the acid is applied in an effective amount to produce a concentration of about 0.001 to 1.0 wt %.

29. A method according to claim 28, wherein the acid is applied in an effective amount to produce a concentration of about 0.005 to 0.5 wt %.

* * * * *